March 28, 1950 W. D. SHIELDS 2,501,855
METAL CUTTING MACHINE
Filed May 28, 1946 4 Sheets-Sheet 1

INVENTOR
William D. Shields
BY
William B. Jaspert
ATTORNEY

WITNESSES:

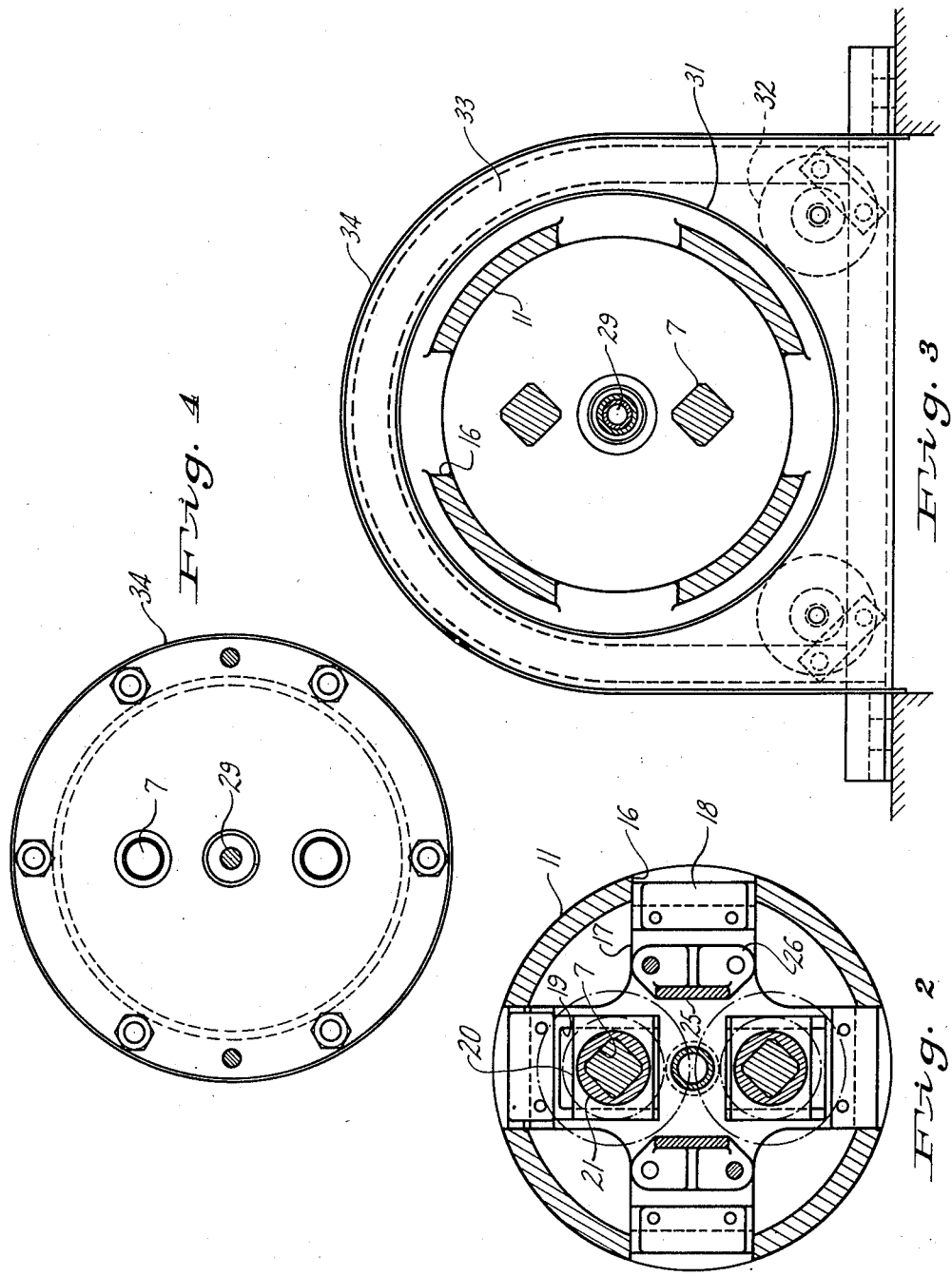

March 28, 1950 — W. D. SHIELDS — 2,501,855
METAL CUTTING MACHINE
Filed May 28, 1946 — 4 Sheets-Sheet 3

INVENTOR
William D. Shields
BY
William B. Jaspert
ATTORNEY

March 28, 1950 W. D. SHIELDS 2,501,855
METAL CUTTING MACHINE
Filed May 28, 1946 4 Sheets-Sheet 4

INVENTOR
William D. Shields
BY William B. Jasper
ATTORNEY

Patented Mar. 28, 1950

2,501,855

UNITED STATES PATENT OFFICE 2,501,855

METAL CUTTING MACHINE

William D. Shields, Sewickley, Pa., assignor to Voss Engineering Company, Pittsburgh, Pa., a corporation of Pennsylvania Application May 28, 1946, Serial No. 672,813

6 Claims. (Cl. 90—15)

1

This invention relates to new and useful improvements in metal cutting machines, and it is among the objects thereof to provide a method of and apparatus for cutting metal by feeding the same into a milling cutter which rotates about its own axis and revolves around the workpiece.

It is another object of the invention to provide a method of cutting rounds either tapered or cylindrical on relatively long metal rods or the like, whereby the work is supported uniformly throughout the cutting operation to maintain accuracy of the cutting action.

Still another object of the invention is the provision of means for turning rounds on bars by maintaining the workpiece stationary and revolving the milling cutter therearound while feeding it longitudinally in the direction of the work, and guiding the milling cutter relative to the workpiece to control the cutting action as desired.

Figures 1, 11:
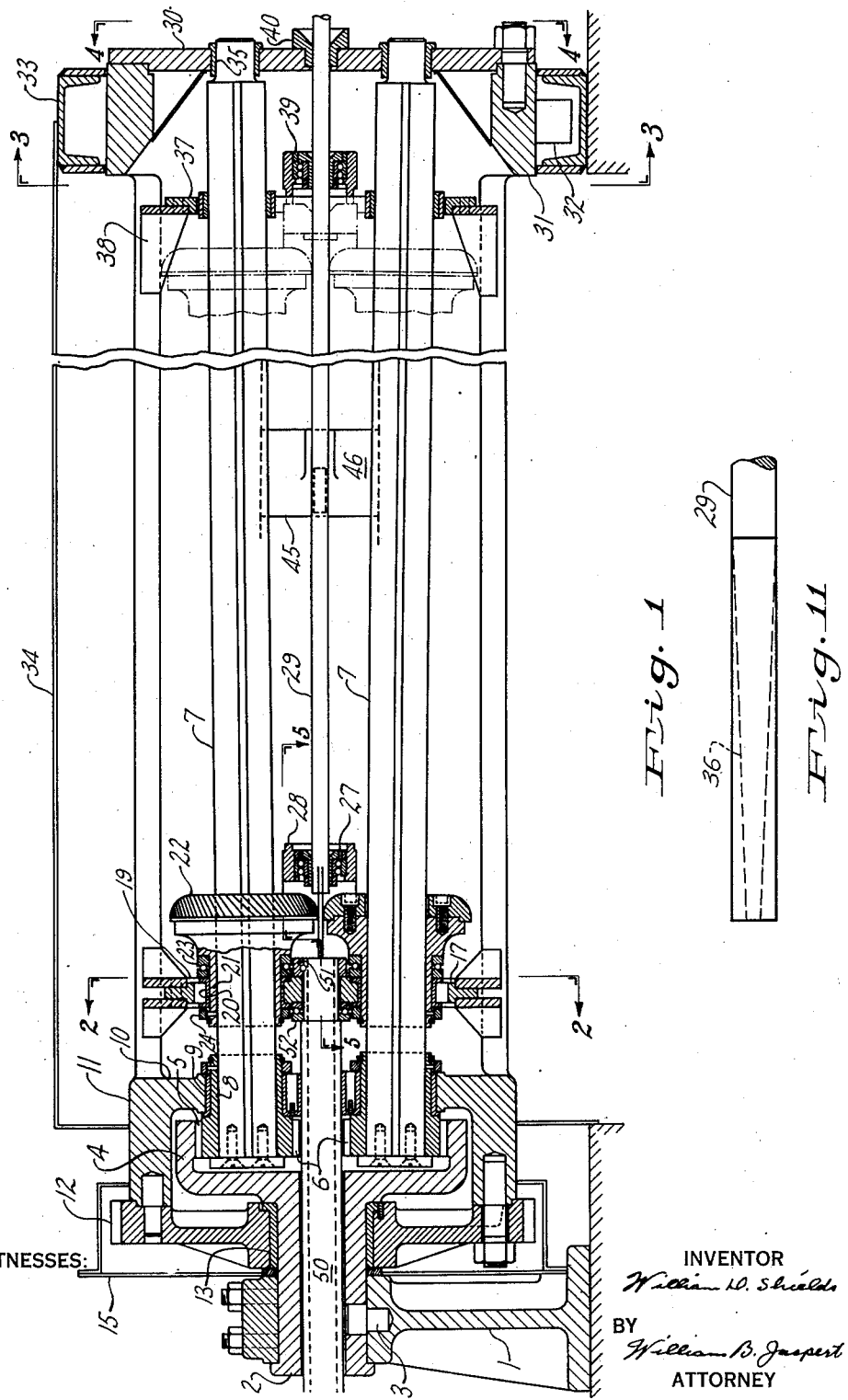
Figure 7:
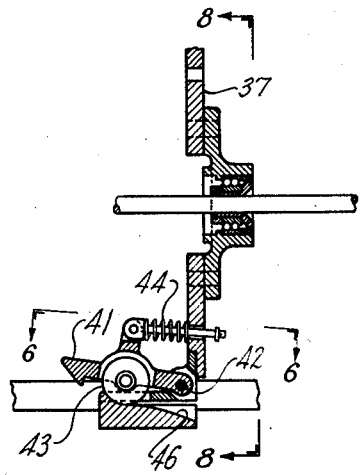
Figure 8:
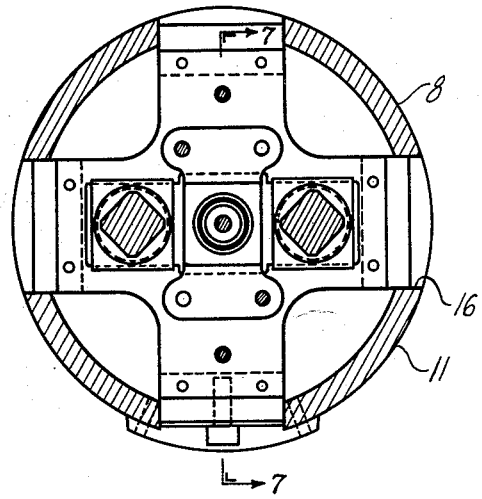
Figure 5:
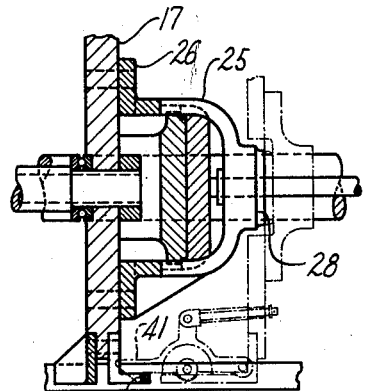
Figure 6:
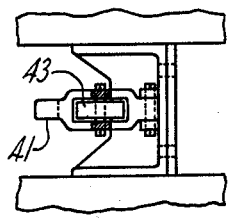
Figure 10:
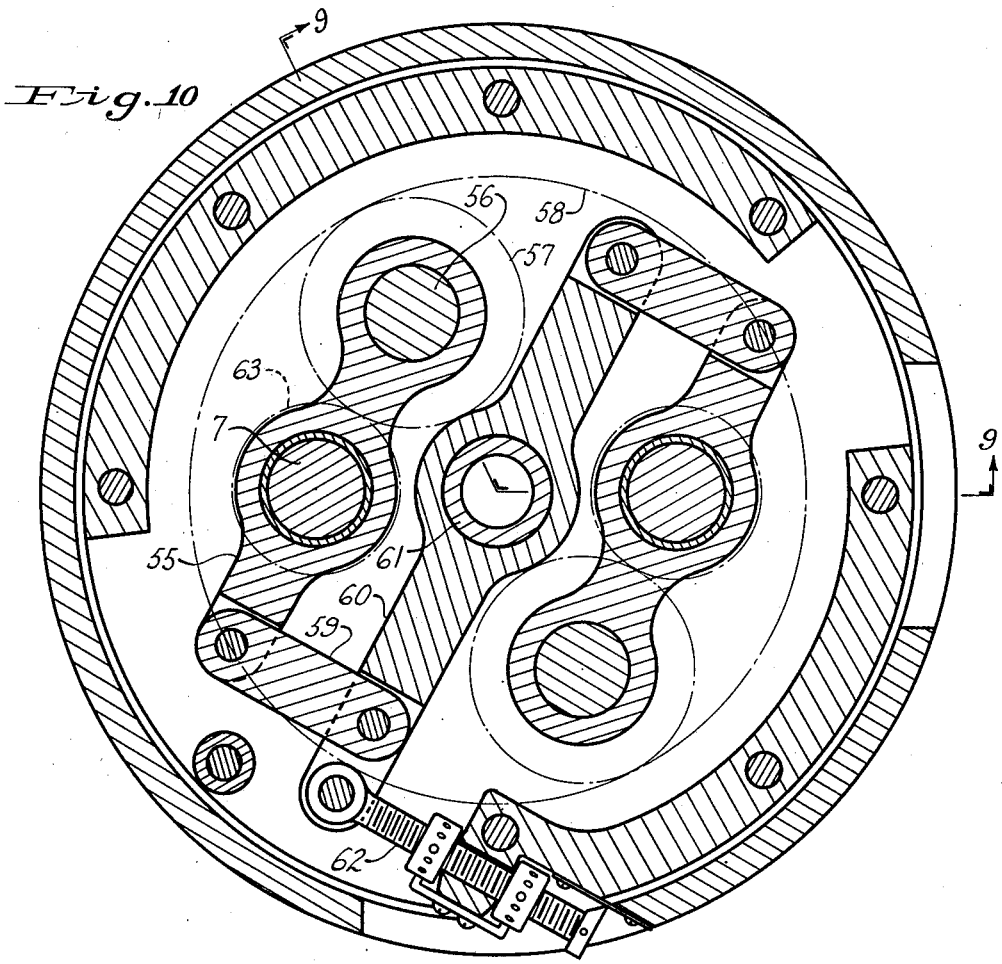
Figure 9:
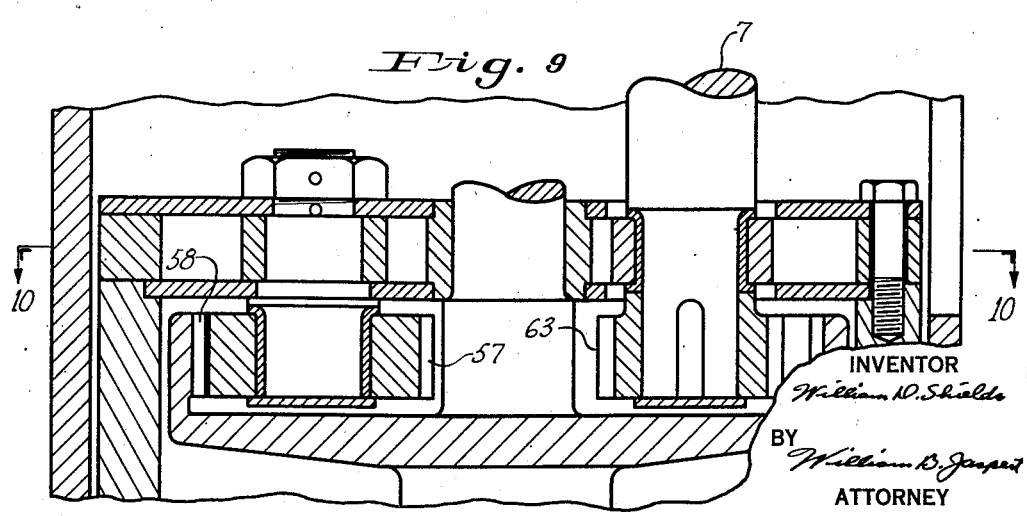

These and other objects of the invention will become more apparent from a consideration of the accompanying drawings, constituting a part hereof, in which like reference characters designate like parts, and in which, Fig. 1 is a vertical cross-sectional view, partially in elevation, of a metal cutting machine embodying the principles of this invention;

Fig. 2 a transverse section, partially in elevation, taken along the line 2—2, Fig. 1;

Fig. 3 a similar view, taken along the line 3—3, Fig. 1;

Fig. 4 an end elevational view, taken along the line 4—4, Fig. 1;

Fig. 5 a longitudinal cross-sectional view, partially in elevation, taken along the line 5—5, Fig. 1;

Fig. 6 a top plan view, partially in section, taken along the line 6—6, Fig. 7;

Fig. 7 a vertical cross-sectional view, partially in elevation, taken along the line 7—7, Fig. 8;

Fig. 8 an end elevational view, partially in cross-section, taken along the line 8—8, Fig. 7;

Fig. 9 a vertical cross-sectional view, partially in elevation, taken along the line 9—9, Fig. 10;

Fig. 10 a transverse section taken along the line 10—10, Fig. 9; and

Fig. 11 a side elevational view of a workpiece.

With reference to Figs. 1 to 8 inclusive of the drawing, the structure therein illustrated comprises a pillow block bearing 1 in which is mounted a flanged sleeve 2 held against rotation by a dowel pin 3, the sleeve 2 having an enlarged bell-shaped end 4 provided with gear teeth 5 which constitutes an orbital gear that interacts with a

2 pair of planetary gear wheels 6 which are secured on cutting spindles 7, the planetary gears 6 having sleeves 8 which are journaled at 9 in an inner flange 10 of a revolving drum 11. A gear wheel 12 is fastened on the end of the drum 11 and is journaled on bearing 13 of the fixed sleeve 2. Gear wheel 12 is a drive gear driven by a motor pinion (not shown). The gear 12 could be a sheave wheel driven by a V-belt if desired. A housing 15 encloses the gear drive 12.

The drum 11, as shown in Figs. 2, 3 and 8, is provided with slots 16 for receiving the arms of a spider 17 to which are attached bearing blocks 18 that have sliding engagement with the walls of the slots 16.

The spider 17 is provided with a window 19 for receiving rectangular bearing blocks 20 which are free to slide radially in the windows 19, the bearing blocks 20 journaling cutter shanks 21 of milling cutters 22, bearings 23 being provided to carry the thrust of the milling cutters 22 and pins 24 being provided to hold the cutter bearings and journal blocks in assembled position as shown in Fig. 1. Extending from the spider arm 17 is a bifurcated bracket 25 having lugs 26 secured to the spider arm 17. The bracket 25 is more clearly shown in Fig. 5 and supports an anti-friction bearing 27 in a hub portion 28 thereof, bearing 27 constituting a support for a workpiece 29, which, as shown in Fig. 1, is in the form of a rod which is secured against movement in an end bracket 30 of the machine as shown in Fig. 1. The work is thereby firmly held while acted upon by the milling cutters 22.

As shown in Fig. 3, the drum 11 is provided with a flanged end 31 which constitutes a track for rollers 32 which are journaled to the frame of a housing 33 having a sheet metal extension 34 for enclosing the entire drum 11. The cutter spindles 7 are journaled at 35 in the end bracket 30 and, as shown in Fig. 1, the center distances of the cutter spindle bearings are greater in the end bracket 30 than in the flange 10 of the drum 11. Thus the spindles taper outwardly so that in the particular case shown the work would be cut tapered as shown in Fig. 11, in which the dotted lines 36 show the milled surface of the piece over a 24 inch length, the piece shown being $\tfrac{7}{8}$ of an inch in diameter and milled down to a $\tfrac{1}{8}$ inch tapered end.

To prevent whipping of the workpiece 29 during the cutting action, a traveling work support 37 is provided which is in the form of a spider as shown in Figs. 7 and 8, the spider having bearing shoes 38 that slide in the slots 16 of the drum 11. Spider 37 carries a bearing 39 which engages the workpiece 29 and supports it intermediate the end support or guide 40 and the inner bearing 28. As shown in Fig. 7, the traveling work support 37 is provided with a latch 41 pivoted at 42 and carrying a roller 43, latch 41 being biased by coil spring 44 to a downward position. The construction of the latch member 41 and roller 43 is shown in elevation in Fig. 6 of the drawing. The purpose of the latch 41 is to release the traveling work support 37 at a desired position intermediate the front and end bearings of the workpiece, this position being shown at 45, Fig. 1 of the drawing, at which a cam track 46 is provided on which the roller 43 travels to raise the latch 41 which is normally engaged with a shoulder 47, Fig. 5, of the spider 17. The cutter support is subjected to longitudinal movement in the drum 11 by a plunger 50 which may be hydraulically actuated, the plunger being mounted in the spider 17 by anti-friction bearings 51 and 52, the latter functioning as a thrust bearing. The operation of the milling cutters and the method of feeding the same into the work will be hereinafter explained.

In Figs. 9 and 10 the cutter spindles 7 are shown mounted on levers 55 that are pivoted on stud shafts 56 carrying pinions 57, the teeth of which interact with an orbital gear 58 such as the gear 4 in Fig. 1. Levers 55 are connected by links 59 to an adjusting lever 60 mounted on a stationary shaft 61. Lever 60 is provided with an adjusting screw 62 whereby the center distances of the cutter shafts 7 may be varied to change the cutting taper on the work without disturbing the mesh of the pinions 57 with the orbital gear 58. As shown in dotted lines in Fig. 10, the gear wheels 57 are intermediate gears that mesh with the pinion gears 63 of the cutter shafts 7. The modified drive of Figs. 9 and 10 takes the place of the drive shown in Fig. 1, the milling cutter and traveling spider mount being as shown in Fig. 1.

The operation of the mechanism described in connection with Figs. 1 to 8 inclusive of the drawing is briefly as follows:

With the workpiece 29 mounted, as shown, in bearings 27, 39 and guide 40 and held against rotation by a chuck (not shown), gear wheel 12 is actuated by a motor or in other suitable manner to revolve drum 11 about its central axis. The drum carrying the spider 17 will revolve the latter, causing rotation of milling cutters 22 about their respective axes by virtue of the cutter spindle 7 having geared connection with the orbital gear 4. As the milling cutters 22 revolve around the workpiece 29, the hydraulic ram 50 will advance to feed the cutters into the work to cut a taper or a cylindrical surface on the workpiece 29, as the case may be. With the cutter shafts 7 as shown in Fig. 1, the machine will cut a taper as the cutters advance along the revolving cutter spindles. When the spider 17 carrying the cutters reaches the position of the intermediate work support spider 37, it will push the same along to the end of the cutting travel, and when the hydraulic ram 50 is moved in the opposite direction to return the cutter supports to their initial position, as shown in Fig. 1, latch 41 will interact with the shoulder 47, Fig. 5, to hook on the traveling support 37 which is carried back to the position where the roller 43 will strike the cam track 46 which causes the latch 41 to lift and release the traveling support 37 from further travel in the direction of the starting end.

Where the drive of Figs. 9 and 10 is utilized, the centers of the cutting spindles may be varied by adjusting screw 62 and otherwise the cutting mechanism and function will be maintained as described in connection with Fig. 1.

It is evident from the foregoing description of the invention that a milling machine of the character there described is capable of rapidly machining relatively thin elongated workpieces, such as aluminum rods or other metals, without twisting or distorting the work acted upon. It is further evident that the work will be fully supported in the region of the cutting action and intermediate its end supports to prevent whipping or buckling of the workpiece. By means of the herein disclosed milling apparatus relatively long tapers may be cut with accuracy and precision.

Although several embodiments of the invention have been herein illustrated and described, it will be evident to those skilled in the art that various modifications may be made in the details of construction without departing from the principles herein set forth.

I claim:

1. A metal cutting machine comprising a revolving drum having a cutting spindle mounted therein, a gear wheel at the end of said spindle, a stationary orbital gear within said drum having teeth interacting with the teeth of said cutter spindle gear, a cutter mounted on said spindle for rotation therewith, said cutter being mounted on a feedhead movably mounted in said drum adapted to traverse the length of said cutter spindle to move the cutter thereon, and means for mounting a workpiece against movement centrally of said drum in the path of movement of said cutter, said cutter spindle being adapted for cutting a taper on the workpiece as the cutter traverses in a longitudinal direction thereon, and means for moving said cutter head.

2. A milling machine for cutting tapers or the like on long cylindrical workpieces which comprises a plurality of end bearings, a frame supported for rotary movement on said bearings, said frame having ways for mounting and guiding a cutter head and a work support therein, a plurality of cutter spindles mounted to be angularly movable with said frame and journaled to be rotatable when said frame is revolved, said cutter spindles having gears, one of said end bearings having a stationary orbital gear for interacting with the gears of the cutter spindles, and means for subjecting the cutter head to movement in an axial direction within said revolving frame, the cutters being of the milling type having cutting teeth on the periphery thereof for engagement with the work to be acted upon.

3. In a metal cutting machine, a plurality of spaced bearings, a rotary frame mounted thereon, a cutter head mounted to be rotated with said frame and to be moved axially thereon, a stationary internal gear, a cutter spindle journaled in said head having a gear wheel coacting with said stationary gear, a milling cutter on said spindle rotatable therewith and slidably mounted thereon, a traveling work support mounted for axial movement in said rotary frame, latching means on said support for engaging said cutter head to be movable therewith, and cam means in the path of movement of said last-named means for releasing the support at a predetermined point in its travel longitudinally in said frame.

4. In a metal cutting machine, a plurality of spaced bearings, a rotary frame mounted thereon, a drive mechanism for said frame, a cutter head mounted for rotation with said frame, a cutter spindle journaled in said head, a drive mechanism for said spindle comprising a stationary gear and a gear on said cutter spindle interacting therewith whereby on rotation of the frame said spindles will revolve, a cutter mounted on the spindle to be slidable thereon and for rotation therewith, means for subjecting said cutter head to axial movement relative to said spindle, a traveling work support intermediate the cutter head and the extended end of said rotary frame, latch mechanism on said traveling work support adapted to interlock with the cutter head, means in the path of movement of the traveling work support for releasing the latch to thereby release said traveling support from movement with the cutter head, and a housing for said rotary frame, said cutter head having a work support in alignment with the traveling work support.

5. In a metal cutting machine, a plurality of spaced bearings, a rotary frame mounted thereon, a cutter head mounted to be rotated with said frame and to be moved axially thereon, a cutter spindle journaled in said head having its longitudinal axis off-set with respect to the true axis of the rotary frame, drive mechanism for said spindle embodying the stationary gear and a gear on the end of the spindle interacting with said first-named gear to subject the spindle to rotary movement with the rotary movement of said frame, means for moving said cutter head in an axial direction, said cutter head having a support for the work to be acted upon movable with the cutter head, a traveling work support in alignment with said first-named work support, means connecting said work supports for reverse movement of said head, and means in the path of movement of the traveling work support for releasing the latter from the cutter head at a predetermined point of travel of said traveling work support.

6. In a metal cutting machine, a plurality of spaced bearings, a rotary frame mounted thereon, a cutter head mounted to be rotated with said frame and to be moved axially thereon, a cutter spindle journaled in said head having its longitudinal axis off-set with respect to the true axis of the rotary frame, drive mechanism for said cutter head comprising a lever carrying a cutter spindle pivotally mounted on a stud shaft having a gear wheel interacting with the teeth of said stationary wheel and said cutter shaft having a gear wheel interacting with the teeth of said stud shaft gear wheel, a second lever pivotally connected to said first-named lever including adjusting means for actuating said lever to vary the center distance of the cutter shaft relative to the center of the cutting machine, a cutter mounted on said cutter spindle for sliding movement thereon having a spline connection therewith and being rotatable in response to rotary movement of the rotary frame, and means for rigidly mounting a rod to be acted upon by the cutter centrally of said rotary frame, whereby, upon feeding of the cutter head in the direction of said rod, a tapered surface is milled on said rod.

WILLIAM D. SHIELDS.

REFERENCES CITED

The following references are of record in the file of this patent:

UNITED STATES PATENTS

| Number | Name | Date |
| --- | --- | --- |
| 2,035,810 | Hofmann | Mar. 31, 1936 |